United States Patent [19]

Brescia

[11] 4,378,563
[45] Mar. 29, 1983

[54] ELECTRONIC PRINTER WITH SINGLE TRACING ELEMENT

[75] Inventor: Riccardo Brescia, Ivrea, Italy

[73] Assignee: Ing. C. Olivetti & C., S.p.A., Ivrea, Italy

[21] Appl. No.: 298,793

[22] Filed: Sep. 2, 1981

[30] Foreign Application Priority Data

Sep. 29, 1980 [IT] Italy .............................. 68498 A/80

[51] Int. Cl.³ ....................... G01D 9/00; G01D 15/24
[52] U.S. Cl. ................................. 346/1.1; 346/139 R
[58] Field of Search ............................ 346/139 R, 1.1

[56] References Cited

U.S. PATENT DOCUMENTS 3,886,308 5/1975 Costello et al. ............ 346/139 A X
4,348,697 9/1982 Takahashi et al. ......... 346/139 A X Primary Examiner—Donald A. Griffin
Attorney, Agent, or Firm—Schuyler, Banner, Birch, McKie & Beckett

[57] ABSTRACT

The printer comprises a ROM recorded for each character with a set of pairs of numerical instructions, of which one represents the direction of a constant velocity vector of the tracing element for tracing a segment of the character, and the other represents the duration for which that velocity has to be applied to said element. The direction instruction is decoded by a decoder in order to generate two orthogonal components which control two servo-mechanism by way of two corresponding D/A converters. The duration of the movement is controlled by a counter loaded by the duration instruction and decremented by a clock signal. Every time the counter is emptied a logic unit responds by addressing the next byte in the ROM.

5 Claims, 4 Drawing Figures

ELECTRONIC PRINTER WITH SINGLE TRACING ELEMENT

BACKGROUND OF THE INVENTION

This invention relates to an electronic printer comprising a single tracing element, in which the tracing element is moved relative to the paper in accordance with two coordinates parallel to the printing plane in order to trace alphanumerical characters independently of the advancement of the printing. More particularly, the invention relates to a method and apparatus for such printers in which a memory stores a set of numerical data for generating each of the characters. Various printers of the aforesaid type are known in which the instructions for tracing a carhacter are stored in a memory, or transmitted over a line. It has also been proposed to control the movements of the tracing element by means of servo-mechanism controlled by numerical instructions. These instructions define the velocity of the two components, which controls the corresponding servo-mechanism for a constant time period, so that each instruction represents the X and Y components of velocity vectors of variable length. The velocity of the tracking element thus varies along the trajector, and its average is less than the allowable maximum velocity for the tracing element. Moreover, if the tracing element comprises a store of ink, the definition of the sign, and in particular the ink delivered, can vary according to the velocity of movement of the tracing element.

SUMMARY OF THE INVENTION

The object of the invention is to provide a printer of the aforesaid type, in which the characters are generated with maximum velocity, and in which the definition of the sign is not influenced by the type of element or the type of inking used.

According to the invention, I now provide an electronic printer comprising character generating apparatus with a single tracing element which is moved relative to the paper in accordance with two coordinates parallel to the printer plane in order to trace alphanumerical characters independently of the advancement of the printing, comprising a memory storing a set of numerical data for generating each of the characters, each set of data comprising a sequence of pairs of instructions, namely a direction instruction indicative of the direction of movement for tracing a segment of the character, and a duration instruction indicative of the duration of tracing the segment, and means arranged to move the tracing element along each segment with constant velocity in the direction of movement given by the direction instruction and for the duration given by the duration instruction.

BRIEF DESCRIPTION OF THE DRAWINGS

The invention will be described in more detail, by way of example, with reference to the accompanying drawings, in which.

DESCRIPTION OF THE PREFERRED EMBODIMENT

Figure 1:
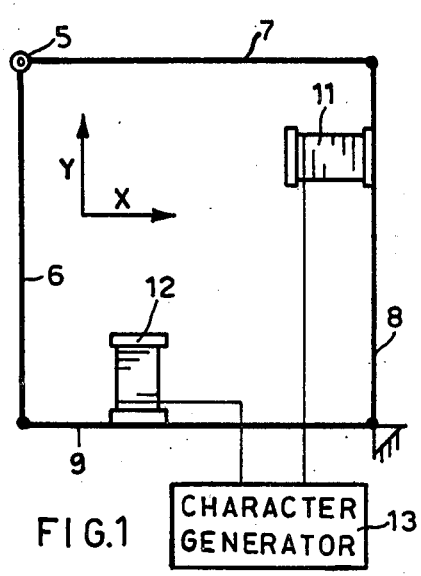
FIG. 1 is a diagram of a printer comprising a single tracing element and embodying the invention.

The character generating method and apparatus are applied to an electronic printer comprising a single tracing element, for example a stylus with an ink store, an ink jet nozzle, or a stylus cooperating with an inked ribbon, of the type described in our British patent specification No. 1569820. The tracing element 5 (FIG. 1) is mounted on a vertex of an articulated parallelogram 6, 7, 8 and 9, in which the vertex opposite that of the element 5 is fixed. The arms 8 and 9 are moved by means of two servo-mechanism 11 and 12 constituted for example by two moving coil electromagnets, which are controlled by a numerically controlled character generating apparatus 13.

Figure 2:
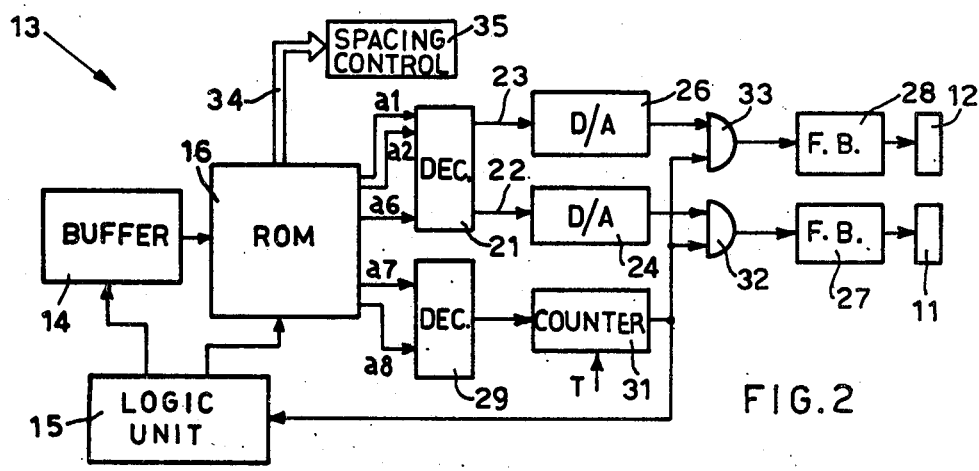
FIG. 2 is a block diagram of the character generating apparatus of the printer.

The apparatus 13 (FIG. 2) comprises an input memory 14, for example a keyboard buffer, in which the codes for the characters to be traced are stored. These codes are read out one at a time under the control of a logic unit 15 for addressing corresponding portions of a read only memory 16, for character generation. At each address, the ROM 16 is permanently recorded with an item of numerical data, each comprising a byte of 8 bits representing a rectilinear segment to be traced.

Each piece of numerical data can also comprise other serve bits, for example for controlling the thickness of the sign. The set of bytes pertaining to a character are read in sequence under the control of the logic unit 15 and represent the character in the form of a broken line. The ROM 16 comprises 96 sets of data, one set for each character. It is apparent that the number of segments of each character can be increased in order to have segments sufficiently short to give the required degree of definition to the character. The set of data can also comprise spacing instructions associated with each character. The ROM 16 is mounted so that it is easily interchangeable on the printer, in order to allow the operator to easily select the character set to be used.

Figure 3:
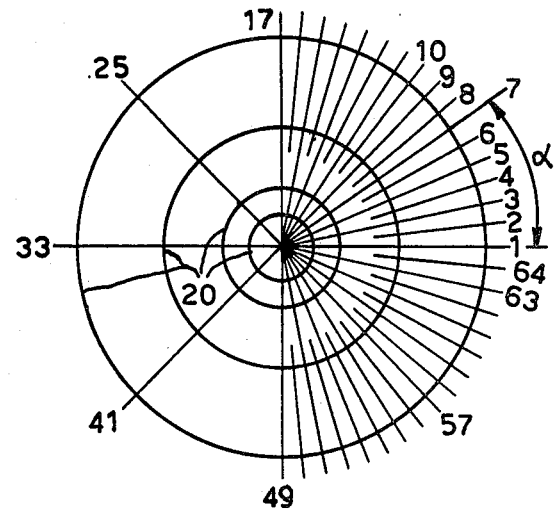
FIG. 3 is a grid showing possible movements of the tracing element.

After addressing the ROM 16 to select the set of data corresponding to a character code emitted by the buffer 14, the sequential extraction of this data from the ROM 16 is controlled by the logic unit 15. At each command of the logic unit 15, the ROM 16 emits at six outputs a1, a2 . . . a6 a like number of bits arranged to select the direction of the velocity vector, so that 64 different directions are possible. These directions are indicated diagrammatically in FIG. 3. In addition, the ROM 16 emits at a further two outputs a7 and a8 two further bits arranged to select the time for which the velocity vector is to be applied to the servo-mechanism. It is thus possible to choose from four different times, which can be chosen for example proprotional to the weights 1, 2, 4 and 7. The respective vectors are defined in FIG. 3 by a like number of circles 20.

The six outputs a1 to a6 are connected to a decoder 21 which correspondingly generates at two outputs 22 and 23 two numerical values proportional to the sine and to the cosine of the angle of the vector with a basic direction "1". The two outputs 22 and 23 are connected to two digital-analogue converters 24 and 25, which in known manner control two corresponding feedback circuits 27 and 28 for the servo-mechanisms 11 and 12, such that the electromagnets for X axis and Y axis displacement are operated selectively.

The two outputs a7 and a8 are connected to a decoder 29, which generates at its output the number representing the weight of the two bits. This number is loaded in to a counter 31, which is decremented by a basic clock signal T. By way of two gates 32 and 35, the counter 31 controls the operation of the two feedback circuits 27 and 28 for the servo-mechanisms as long as the counter 31 is not empty. Every time the counter 31 is emptied the logic unit 15 responds by addressing the next byte in the ROM 16.

When the last segment of a character has been traced, the last item of data of the set of data relative to the character is emitted by the ROM 16, under the control of the logic unit 15, at a further set of outputs 34 for controlling a circuit 35 for controlling in known manner the advance of the printing (character feed, line feed).

Consequently, the character generating method consists of firstly recording on the memory 16 for each character a set of pairs of numerical instructions of which one is indicative of the direction and the other of the duration, then addressing the set of pairs of instructions corresponding to the character to be traced, then extracting one pair of instructions at a time from the addressed set, decoding the direction instruction into two orthogonal components, and controlling a pair of servo-mechanism for a time corresponding to the other instruction of the pair.

Figure 4:
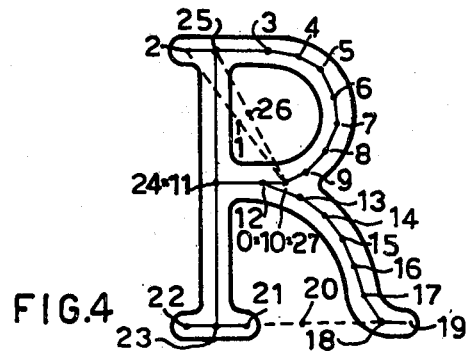
FIG. 4 is an example of a character generated by the apparatus of FIG. 2.

FIG. 4 shows an example of a printed character "R". By means of black dots indicated by progressive numbers, the figure shows the points of arrival of the successive segments through which the element 5 passes in tracing the character, in obedience to the corresponding instructions at the output of the ROM 16. The length of the segments is always a multiple of a basic length. The broken lines correspond to the portions passed through with the element 5 not in contact with the paper. So-called Z-axis control for the stylus can be effected in known manner dependent on the nature of the stylus in response to a service bit associated with each byte and whose values 0 and 1 indicate "no mark" and "mark" respectively. Alternatively intermittent service codes can indicate when the stylus is to start and to stop marking.

It is apparent that various modifications and improvements can be made to the described method and apparatus without leaving the scope of the invention as claimed. For example, instead of 64 directions, 48 can be used, and the zero value of the configuration of the bits a1 . . . a6 can be used for zero velocity, i.e. for stoppage.

In addition, the apparatus can be provided with a control member for defining the basic segment and thus the dimension of the characters. Other control means can act on the converters 24 and 26, in order to vary the ratio of the height to the width of the character, or to vary the inclination.

I claim:

1. An electronic printer comprising character generating apparatus with a single tracing element which is moved relative to the paper in accordance with two coordinates parallel to the printer plane in order to trace alphanumerical characters independently of the advancement of the printing, the apparatus comprising a memory storing a set of numerical data for generating each of the characters, each set of data comprising a sequence of pairs of instructions; namely a direction instruction indicative of the direction of movement for tracing a segment of the character, and a duration instruction indicative of the duration of tracing the segment, and means arranged to move the tracing element along each segment with constant velocity in the direction of movement given by the direction instruction and for the duration given by the duration instruction.

2. A printer as claimed in claim 1, wherein the direction instruction is decoded by a decoder which generates a pair of component signals for the two axes of movement of the tracing element.

3. A printer as claimed in claim 2, wherein the two component signals feed a pair of digital-analogue converters for controlling a pair of servo-mechanisms.

4. A printer as claimed in claim 3, wherein each duration instruction loads a timing counter which governs the control of the servo-mechanisms.

5. Generating method for characters to be traced by a single tracing element movable along two axes parallel to the printing plane, characterised in that firstly for each character there is recorded in a memory a set of parts of numerical instructions, of which one is indicative of the direction of movement of the element for tracing a segment of the character, and the other of the duration of the movement, then the set of pairs of instructions corresponding to the character to be traced is addressed, the pairs of instructions are read out sequentially from the addressed set, the direction instruction is decoded into two orthogonal components, and a pair of servo-mechanisms is controlled for a time corresponding to the other instruction of the pair.

* * * * *